(12) United States Patent
Nakayama et al.

(10) Patent No.: US 11,949,303 B2
(45) Date of Patent: Apr. 2, 2024

(54) STATOR, TERMINAL BLOCK, AND ROTATING ELECTRIC MACHINE

(71) Applicant: HITACHI ASTEMO, LTD., Hitachinaka (JP)

(72) Inventors: Kenichi Nakayama, Ibaraki (JP); Hiromitsu Okamoto, Ibaraki (JP); Satoshi Yamamura, Ibaraki (JP); Tomohiro Adachi, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 310 days.

(21) Appl. No.: 17/613,544

(22) PCT Filed: May 29, 2020

(86) PCT No.: PCT/JP2020/021293
§ 371 (c)(1),
(2) Date: Nov. 23, 2021

(87) PCT Pub. No.: WO2020/246372
PCT Pub. Date: Dec. 10, 2020

(65) Prior Publication Data
US 2022/0239176 A1    Jul. 28, 2022

(30) Foreign Application Priority Data
Jun. 7, 2019 (JP) .................. 2019-107101

(51) Int. Cl.
*H02K 3/24* (2006.01)
*H02K 1/16* (2006.01)
(Continued)

(52) U.S. Cl.
CPC .............. *H02K 3/24* (2013.01); *H02K 1/165* (2013.01); *H02K 3/345* (2013.01); *H02K 9/19* (2013.01); *H02K 2203/03* (2013.01)

(58) Field of Classification Search
CPC .......... H02K 3/24; H02K 1/165; H02K 3/345; H02K 9/19; H02K 2203/03;
(Continued)

(56) References Cited

U.S. PATENT DOCUMENTS

2008/0136274 A1* 6/2008 Fujii .................... H02K 15/085
310/201
2012/0019081 A1    1/2012 Tamura et al.
(Continued)

FOREIGN PATENT DOCUMENTS

| JP | 2012-029355 A | 2/2012 |
| JP | 2016-025745 A | 2/2016 |
| WO | WO-2017/195481 A1 | 11/2017 |

OTHER PUBLICATIONS

International Search Report with English translation and Written Opinion issued in corresponding application No. PCT/JP2020/021293 dated Sep. 15, 2020.

*Primary Examiner* — Thomas Truong
(74) *Attorney, Agent, or Firm* — Foley & Lardner LLP

(57) ABSTRACT

An object of the present invention is to efficiently cool a rotor coil even in a rotor provided with a wire connection plate. A stator of a rotating electric machine includes a stator core, a plurality of segment coils protruding from slots of the stator core and arranged in a radial direction, a connection conductor that connects the segment coils, and an insulating member that holds the connection conductor. The insulating member includes a through hole through which the segment coil penetrates and is accommodated. An opening through which a coolant can flow into the through hole is provided on an inner peripheral side of the insulating member.

7 Claims, 7 Drawing Sheets

(51) Int. Cl.
*H02K 3/34* (2006.01)
*H02K 9/19* (2006.01)

(58) Field of Classification Search
CPC ...... H02K 2203/09; H02K 3/50; H02K 5/203; H02K 3/28; H02K 3/34; H02K 3/38; H02K 2203/06; H02K 2213/03
See application file for complete search history.

(56) References Cited

U.S. PATENT DOCUMENTS

2016/0020658 A1   1/2016  Tamura
2016/0308406 A1* 10/2016 Kitora .................... H02K 9/227
2019/0149003 A1   5/2019  Ishikawa et al.

* cited by examiner

STATOR, TERMINAL BLOCK, AND ROTATING ELECTRIC MACHINE

TECHNICAL FIELD

The present invention relates to a stator of a rotating electric machine.

BACKGROUND ART

In the present invention, a rotating electric machine is required to have a high output, and it is desired to increase a turn of a coil.

Background art of the present technical field includes the following prior art. In Patent Literature 1 (WO 2017/195481A), the axial length of the stator is extended to increase the size, and the connection points are on both end sides of the stator core, so that the productivity of the rotating electric machine is deteriorated. A rotating electric machine includes: a stator core; a stator winding including a plurality of segment coils; and a wire connection plate that fixes a different-phase connection conductor connecting different phases of segment coils of the stator winding and an in-phase connection conductor connecting in-phase segment coils of the stator winding. The stator winding includes a coil connection portion to which ends of the plurality of segment coils are connected on one side with respect to an axial direction of the stator core, and the wire connection plate is disposed on a side where the coil connection portion is disposed with respect to the stator core.

CITATION LIST

Patent Literature

PTL 1: WO 2017/195481 A

SUMMARY OF INVENTION

Technical Problem

With such an increase in the number of turns of a stator coil, there is a problem that the temperature rises in the input/output portion where the coils are densely arranged. Therefore, cooling of the coil by a coolant (for example, ATF) flowing into the slot is required. However, the wire connection plate attached to the upper surface side of the stator may prevent the coolant from flowing into the slot. For this reason, the shape of the wire connection plate that does not prevent the inflow of the coolant is required.

Solution to Problem

A representative example of the invention disclosed in the application is as follows. That is, a stator of a rotating electric machine includes: a stator core; a plurality of segment coils protruding from slots of the stator core and arranged in a radial direction; a connection conductor that connects the segment coils; and an insulating member that holds the connection conductor. The insulating member includes a through hole through which the segment coil penetrates and is accommodated. An opening through which a coolant can flow into the through hole is provided on an inner peripheral side of the insulating member.

Advantageous Effects of Invention

According to the present invention, the rotor coil can be efficiently cooled even by the rotor provided with the wire connection plate. Objects, configurations, and effects besides the above description will be apparent through the explanation on the following embodiments.

DESCRIPTION OF EMBODIMENTS

Hereinafter, embodiments of the present invention will be described with reference to the drawings.

The rotating electric machine according to the present embodiment is a rotating electric machine suitable for use in traveling of an automobile. Here, a so-called electric vehicle using a rotating electric machine includes a hybrid type electric vehicle (HEV) including both an engine and a rotating electric machine and a pure electric vehicle (EV) that travels only with a rotating electric machine without using an engine, but the rotating electric machine described below can be used for both types.

Figure 1:
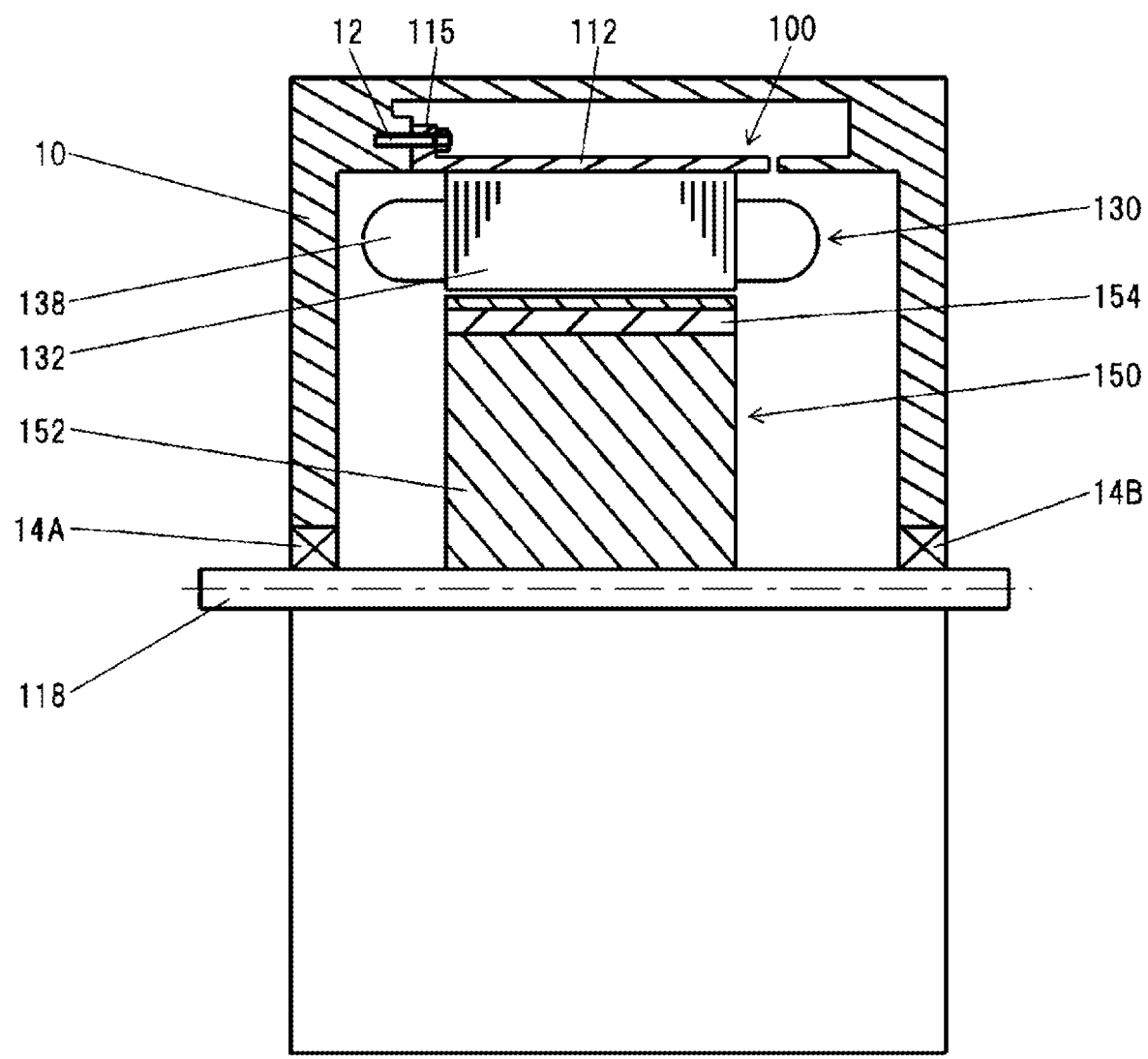
FIG. 1 is a schematic diagram illustrating an overall configuration of a rotating electric machine according to an embodiment of the present invention.

FIG. 1 is a schematic diagram illustrating an overall configuration of a rotating electric machine 100 according to an embodiment of the present invention. FIG. 1 illustrates the inside of the rotating electric machine 100 with a part of the rotating electric machine 100 as a cross section. The rotating electric machine 100 is disposed inside a case 10 and includes a housing 112, a stator 130 having a stator core 132 fixed to the housing 112, and a rotor 150 rotatably disposed in the stator 130. The case 10 may be configured by a case of an engine or a case of a transmission.

The rotating electric machine 100 is a three-phase synchronous motor with a built-in permanent magnet. In the present embodiment, a three-phase synchronous motor will be described as an example of the rotating electric machine 100, but the present invention can also be applied to an induction motor.

The rotating electric machine 100 of the present embodiment operates as an electric motor that rotates the rotor 150 by supplying a three-phase alternating current to a stator coil 138 wound around the stator core 132. When driven by an engine, the rotating electric machine 100 operates as a generator and outputs generated power of three-phase alternating current. That is, the rotating electric machine 100 has both a function as an electric motor that generates rotational torque on the basis of electric energy and a function as a generator that generates power on the basis of mechanical energy, and the above-described functions can be selectively used depending on the traveling state of the automobile.

The stator 130 is fixed to the housing 112. The stator 130 is fixed and held in the case 10 by fastening a flange 115 provided in the housing 112 to the case 10 with a bolt 12. The rotor 150 fixed to a rotation shaft 118 is supported by bearings 14A and 14B of the case 10, and is rotatably held inside the stator core 132.

Figure 2:
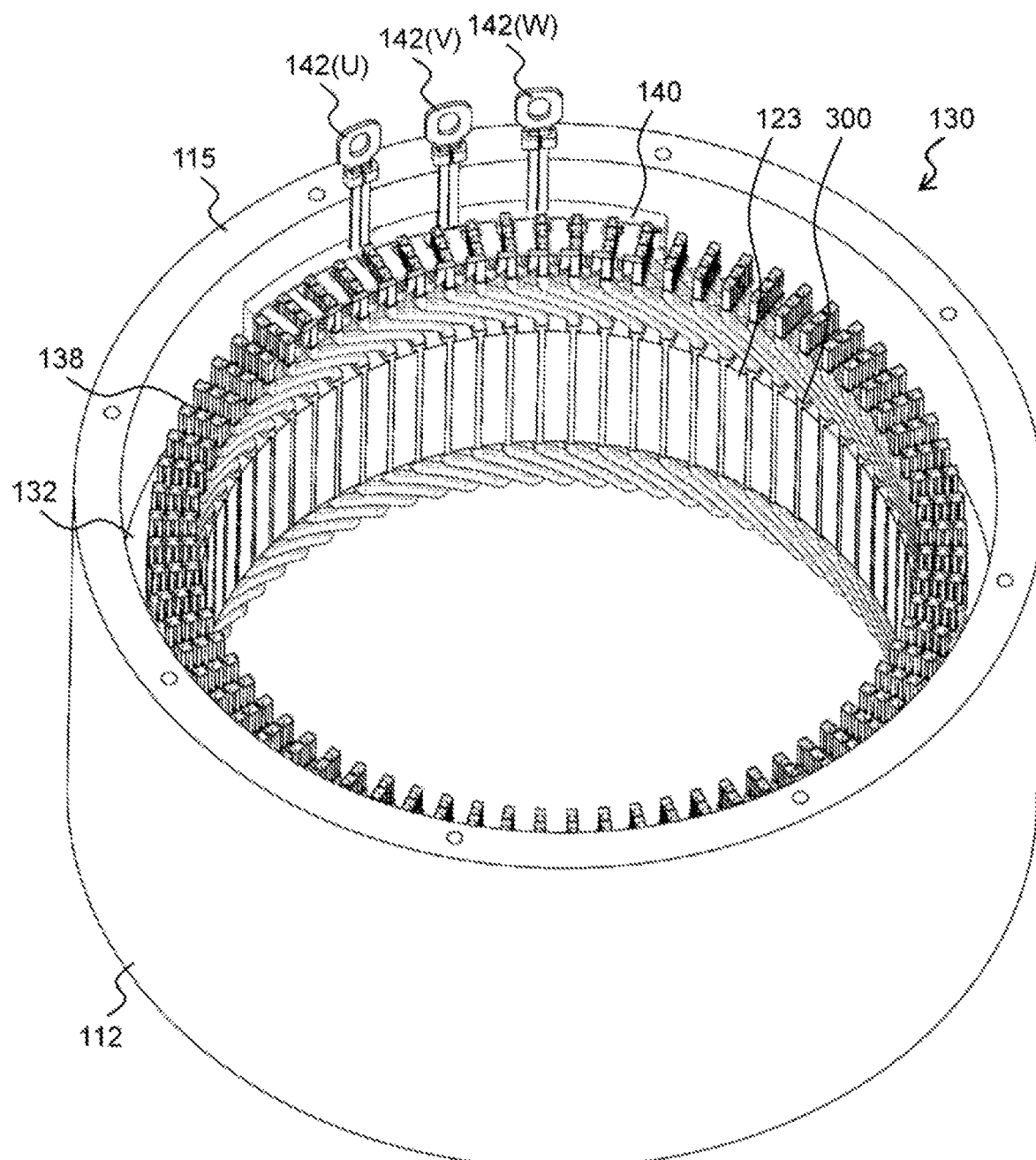
FIG. 2 is a perspective view illustrating a stator attached to a housing of the present embodiment.
Figure 3:
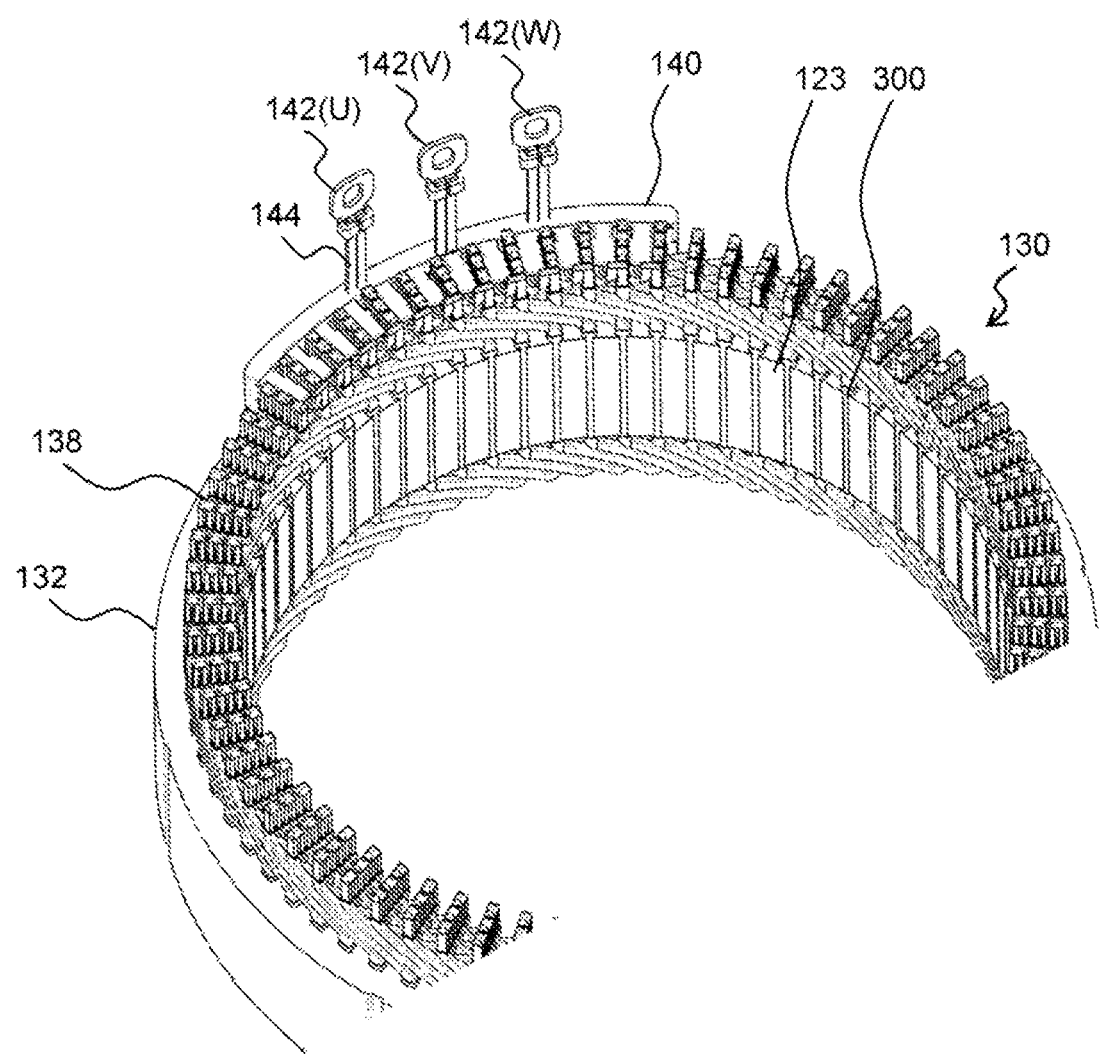
FIG. 3 is a perspective view of a stator removed from the housing of the present embodiment.

FIG. 2 is a perspective view illustrating the stator 130 attached to the housing 112, and FIG. 3 is a perspective view of the stator 130 detached from the housing 112. In FIG. 3, a part of the stator core 132 is omitted.

The housing 112 is formed in a cylindrical shape by drawing a steel plate (such as a high-tensile steel plate) having a thickness of about 2 to 5 mm. The flange 115 is provided at one axial end of the housing 112, and is fixed to the case 10 with the bolt 12 as described above (see FIG. 1). The flange 115 is formed integrally with the housing 112 by drawing. Note that the stator 130 may be directly fixed to the case 10 without providing the housing 112.

The stator 130 is fixed to the inner peripheral side of the housing 112 and includes the cylindrical stator core 132, and the stator coil 138 and a wire connection plate 140 attached to the stator core 132. The stator core 132 is formed by stacking a plurality of electromagnetic steel sheets 133 formed by punching or etching with a thickness of about 0.05 to 1.0 mm, for example. The laminated electromagnetic steel sheets 133 are connected and fixed by welding, and deformation of the electromagnetic steel sheets 133 due to a fastening force when being press-fitted into the housing 112 is suppressed.

In the stator core 132, a plurality of slots 122 extending in the axial direction is formed at equal intervals in the circumferential direction. The number of slots 122 is, for example, 72 in the present embodiment. As illustrated in FIG. 2, the stator coil 138 is accommodated in the slot 122. In the example illustrated in FIG. 3, the slot 122 is an open slot, and an opening is formed on the inner peripheral side of the stator core 132. The circumferential width of the opening may be substantially equal to or slightly smaller than the coil mounting portion of each slot 122 to which the stator coil 138 is mounted.

A slot liner 300 is disposed in each slot 122. The slot liner 300 is formed of, for example, a heat-resistant resin into a predetermined shape, and has a thickness of about 0.1 to 0.5 mm. The slot liner 300 is disposed in the slot 122 or in the coil end. The slot liner 300 is disposed between the coils inserted into the slot 122 and between the coil and the inner surface of the slot 122, and functions as an insulating member to improve the withstand voltage between the coils and between the coil and the inner surface of the slot 122.

The stator coil 138 is formed by connecting a plurality of U-shaped segment coils to each other. The segment coil is disposed such that one end thereof is adjacent to the other segment coil and the other end thereof is further adjacent to the other segment coil such that the end thereof is exposed from the slot 122 (that is, the stator 130). The segment coils whose ends are adjacent to each other are connected to each other at the adjacent ends to form the stator coil 138 wound around the stator core 132.

The wire connection plate 140 for connecting the stator 130 and the electric circuit is attached to a part of the end of the segment coil of the stator coil 138.

In addition, the slot liner 300 disposed at the coil end is annularly disposed between the coils for inter-phase insulation and inter-conductor insulation at the coil end. As described above, in the rotating electric machine 100 of the present embodiment, since the slot liner 300 is disposed inside the slot 122 or at the coil end, it is possible to maintain a required withstand voltage even if the insulation film of the coil is damaged or deteriorated.

Teeth 121 are formed between the slots 122, and each tooth 121 is integrally molded with the annular core back 123. The stator core 132 is an integrated core in which the teeth 121 and the core back 123 are integrally molded. The teeth 121 guide the rotating magnetic field generated by the stator coil 138 to the rotor 150, and cause the rotor 150 to generate rotational torque.

The rotor 150 includes a rotor core 152 and a permanent magnet 154 held in a magnet insertion hole formed in the rotor core 152.

In the rotor core 152, rectangular parallelepiped magnet insertion holes are formed at equal intervals in the circumferential direction in the vicinity of the outer peripheral portion. The permanent magnet 154 is embedded in each magnet insertion hole and fixed with an adhesive or the like. A circumferential width of the magnet insertion hole is formed to be larger than a circumferential width of the permanent magnet 154, and magnetic gaps 156 are formed on both sides of the permanent magnet 154. The magnetic gap 156 may be filled with an adhesive or may be fixed integrally with the permanent magnet 154 with a resin.

The permanent magnet 154 forms a field pole of the rotor 150. In the present embodiment, one magnetic pole is formed by one permanent magnet 154, but one magnetic pole may be formed by a plurality of permanent magnets 154. By increasing the number of permanent magnets 154 for forming each magnetic pole, the magnetic flux density of each magnetic pole generated by the permanent magnet 154 increases, and the magnet torque can be increased. As the permanent magnet 154, a neodymium-based or samarium-based sintered magnet, a ferrite magnet, a neodymium-based bonded magnet, or the like can be used, but the residual magnetic flux density of the permanent magnet 154 is desirably about 0.4 to 1.3 T, and a neodymium-based magnet is more suitable. An auxiliary magnetic pole may be formed between the permanent magnets 154.

When the three-phase alternating current is supplied to the stator coil 138 to generate a rotating magnetic field in the stator 130, the rotating magnetic field acts on the permanent magnet 154 of the rotor 150 to generate a magnet torque. Since the reluctance torque described above is generated in the rotor 150 in addition to the magnet torque, both the magnet torque and the reluctance torque described above act as the rotational torque in the rotor 150, and a large rotational torque can be obtained.

Figure 4:
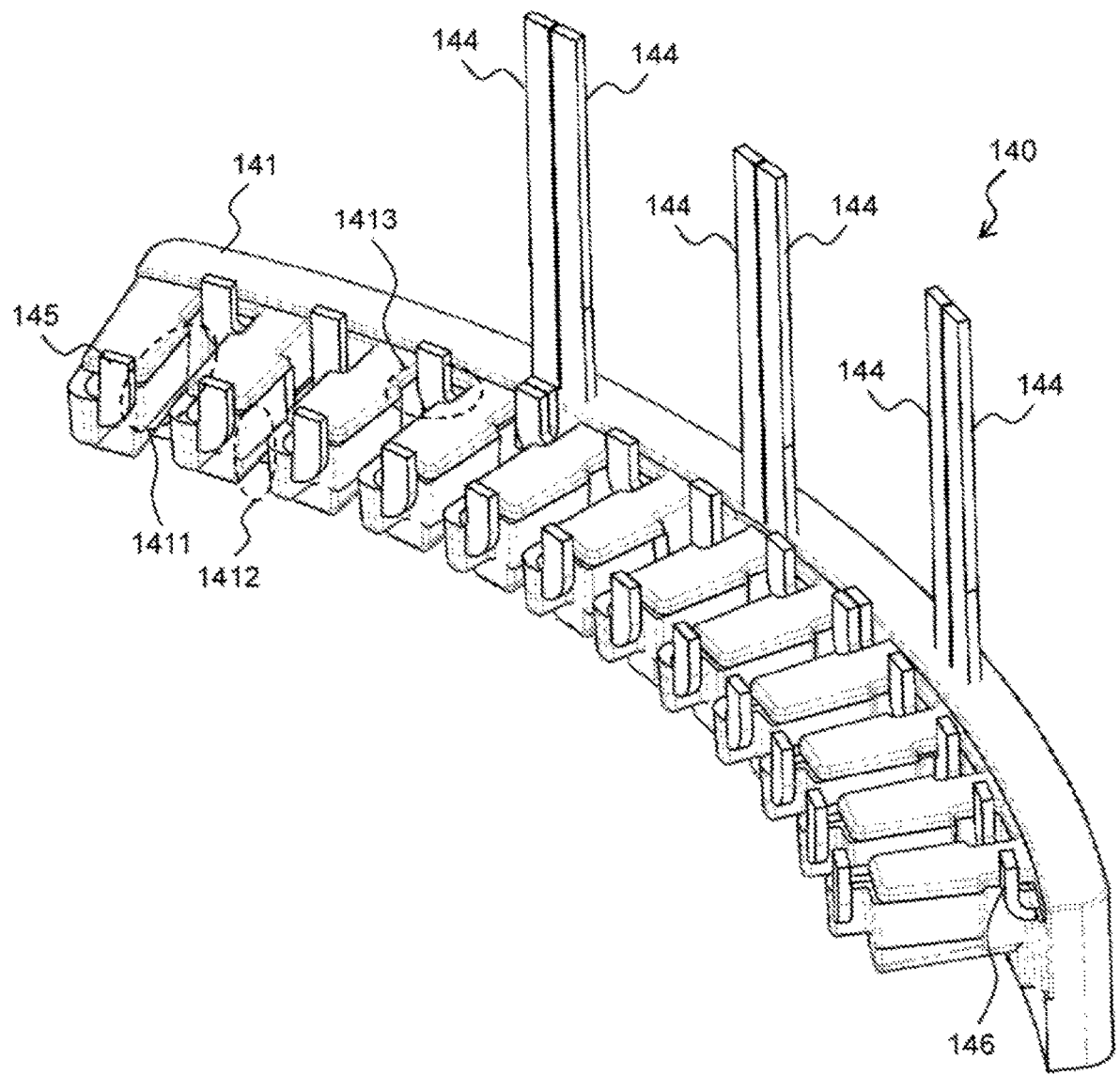
FIG. 4 is a perspective view of a wire connection plate of the present embodiment.
Figure 6:
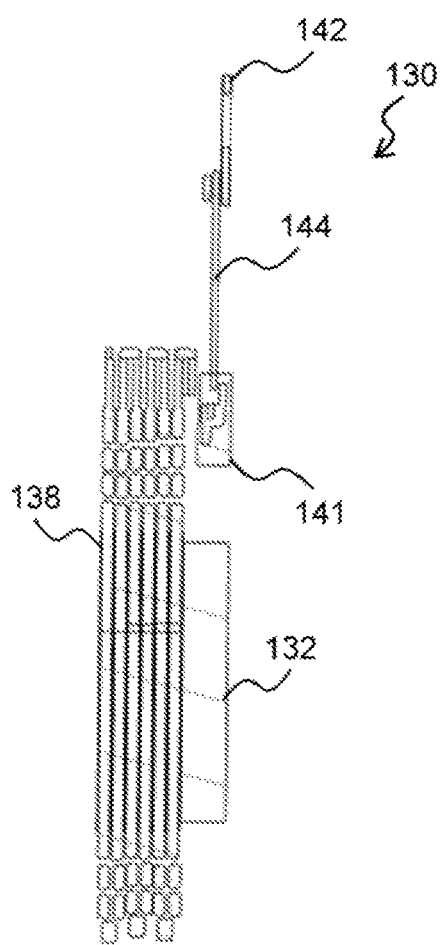
FIG. 6 is a sectional view of the stator in a state where the wire connection plate of the present embodiment is attached.
Figure 7:
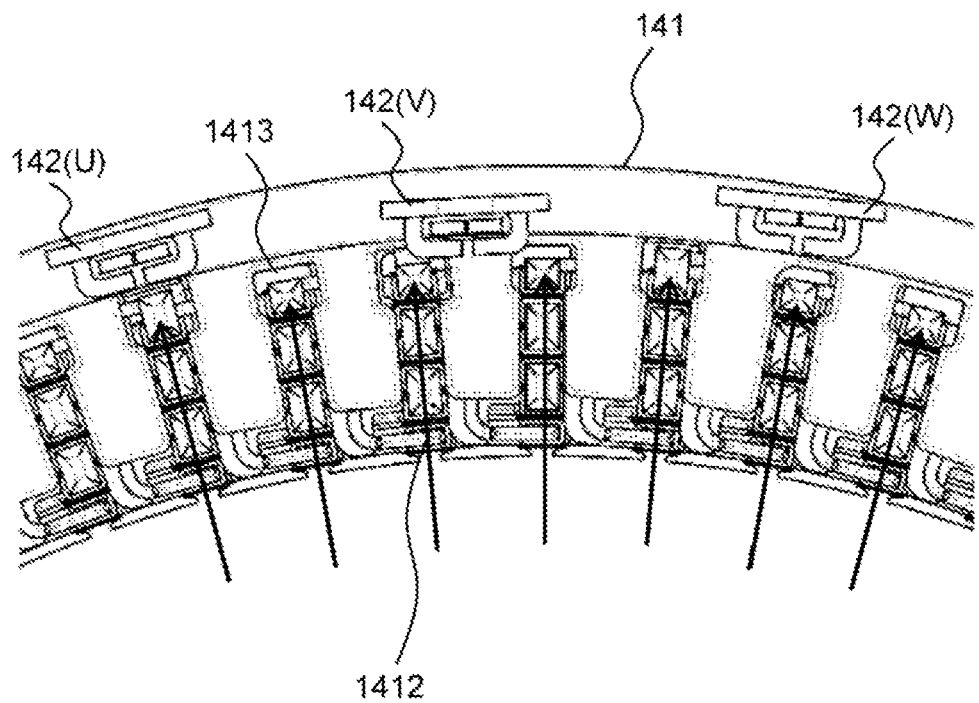
FIG. 7 is a plan view of the stator to which the wire connection plate of the present embodiment is attached.

The wire connection plate 140 will be described with reference to FIGS. 4, 5, 6, and 7. FIG. 4 is a perspective view of the wire connection plate 140, FIG. 5 is a perspective view of an input/output connection conductors 144 arranged inside the wire connection plate 140, FIG. 6 is a sectional view of the stator 130 in a state in which the wire connection plate 140 is attached, and FIG. 7 is a plan view of the stator 130 to which the wire connection plate 140 is attached.

The wire connection plate 140 includes the input/output connection conductor 144 (see FIG. 5) as a lead wire that connects the outside of the rotating electric machine 100 and the stator 130, connection conductors 145 and 146 as relay wires that connect the segment coils, and an insulating member 141 that holds the input/output connection conductor 144 and the connection conductors 145 and 146. A connection terminal 142 is connected to the end of the input/output connection conductor 144 (see FIGS. 2 and 3).

The insulating member 141 is configured to hold the input/output connection conductor 144 and the connection conductors 145 and 146 by integral molding of a resin material. The insulating member 141 is opened (opening 1412) on the inner peripheral side, and forms a comb-like resin terminal block. This opening 1412 is used to introduce cooling oil into the slots 122 of the stator core 132, as will be described later.

Figure 5:
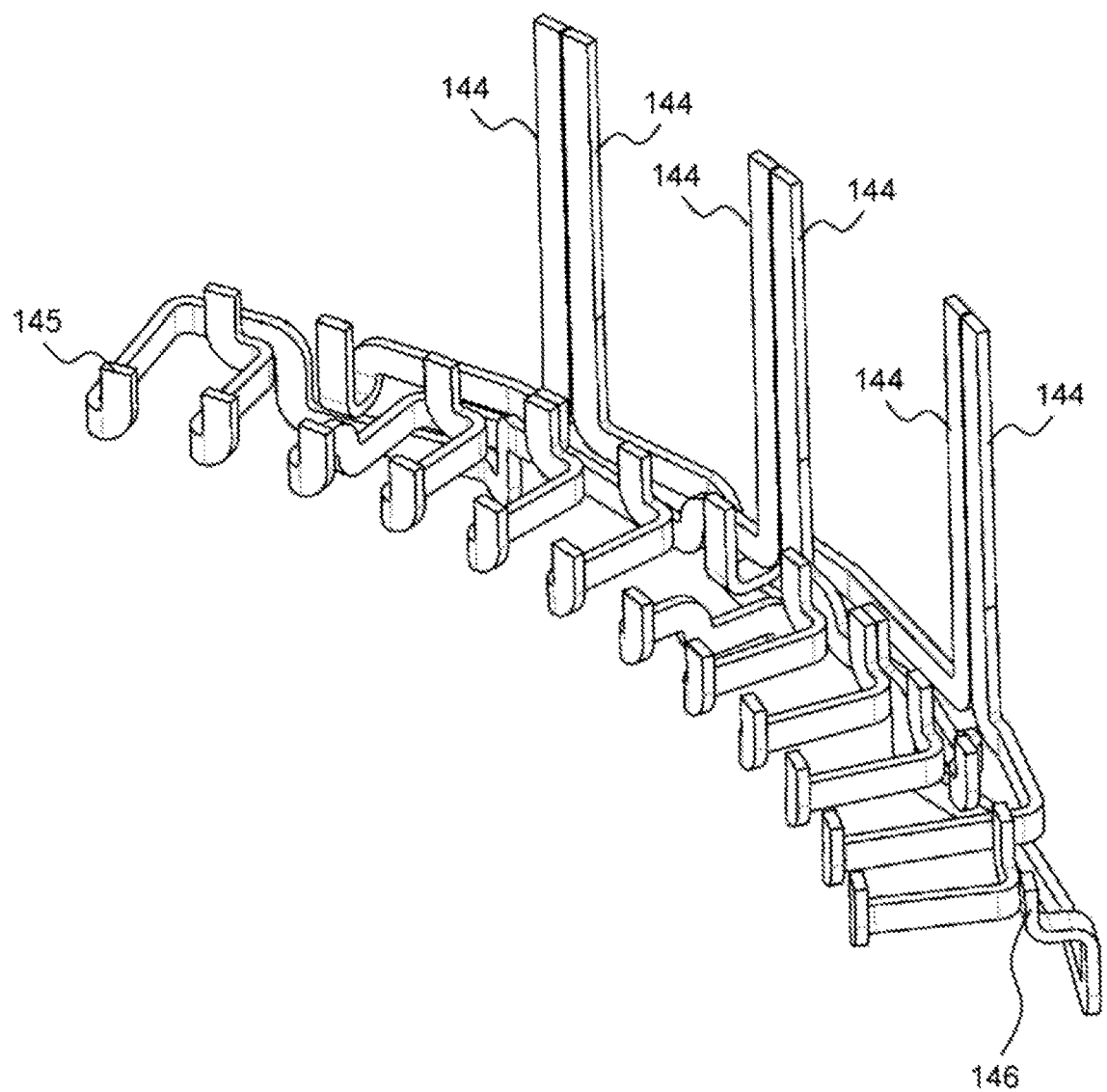
FIG. 5 is a perspective view of an input/output connection conductor built in the wire connection plate of the present embodiment.

As illustrated in FIG. 5, the connection conductors 145 and 146 include an in-phase connection conductor 145 that connects in-phase segment coils and a different-phase connection conductor 146 that connects different-phase segment coils. The connection conductors 144, 145, and 146 are fixed in the insulating member 141 at constant intervals for electrical insulation in the wire connection plate 140.

As illustrated in FIGS. 3, 4, and 7, by passing the end of the segment coil in the axial direction into the through hole 1411 of the wire connection plate 140, the wire connection plate 140 is mounted at a position between the axial end of the segment coil and the axial end of the stator core. By mounting the wire connection plate 140 at this position, the length of the coil end of the stator coil 138 can be shortened, and the rotating electric machine 100 can be downsized.

The insulating member 141 has a size such that an inner peripheral side surface thereof is positioned on an outer peripheral side of the tip of the teeth 121 at a position attached to the stator 130. Therefore, when the rotor 150 is inserted into the stator 130, the wire connection plate 140 and the rotor 150 can be prevented from interfering with each other, and the rotor 150 can be inserted from either the upper side or the lower side.

In addition, the segment coil and the connection conductors 144, 145, and 146 are connected at the upper portion of the stator 130, that is, the upper portion of the wire connection plate 140 on the axial direction side. By connecting the segment coils and the connection conductors 144, 145, and 146 at the upper portion in the axial direction, the conductors can be easily clamped at the time of connecting the segment coils and the connection conductors, the connection portion can be located close to the stator core 132, and the rotating electric machine 100 can be downsized.

By mounting the wire connection plate 140 on the stator coil 138 in this manner, the end of the segment coil and the ends of the connection conductors 144, 145, and 146 are adjacent to each other, and the end of the segment coil and the ends of the connection conductors 144, 145, and 146 can be connected.

Specifically, the in-phase connection conductor 145 is disposed between the two through holes 1411 adjacent to each other in the circumferential direction, and connects the innermost (first layer) segment coil and the outermost (sixth layer) segment coil in the slot 122 on the upper surface of the wire connection plate 140 (see FIG. 5).

In addition, the end of the segment coil of the second layer and the end of the segment coil of the third layer in the slot 122 are connected, and the end of the segment coil of the fourth layer and the end of the segment coil of the fifth layer are connected.

Two input/output connection conductors 144 are provided in each phase, one input/output connection conductor 144 is connected to the segment coil of the innermost circumference (first layer), and the other input/output connection conductor 144 is connected to the segment coil of the outermost circumference (sixth layer). As a result, the coils of the two systems are connected to the connection terminal 142 of each phase.

The different-phase connection conductor 146 connects the ends of the segment coils of different phases, and may extend a neutral point forming a neutral point inside the insulating member 141 to the upper surface of the insulating member 141.

In this manner, an electric circuit of the stator coil 138 is formed by the connection between the segment coil and the connection conductors 144, 145, and 146.

As a method of connecting the end portion of the segment coil and the end portion of each of the connection conductors 144, 145, and 146 and a method of connecting the ends of the U-shaped segment coils to each other, for example, TIG welding can be used, but other joining methods such as laser welding, electron beam welding, and ultrasonic welding can also be adopted.

In the present embodiment, the connection conductors 144, 145, and 146 adjacent to the innermost peripheral segment coil are provided at positions adjacent to the end portion of the segment coil in the circumferential direction, and the end of the conductor does not prevent the cooling oil from flowing into the opening 1412. In addition, the connection conductors 144, 145, and 146 adjacent to the outermost peripheral segment coil are provided at positions radially adjacent to the end portion of the segment coil, and are cooled by the cooling oil reaching a reservoir 1413 to be described later.

Figure 8:
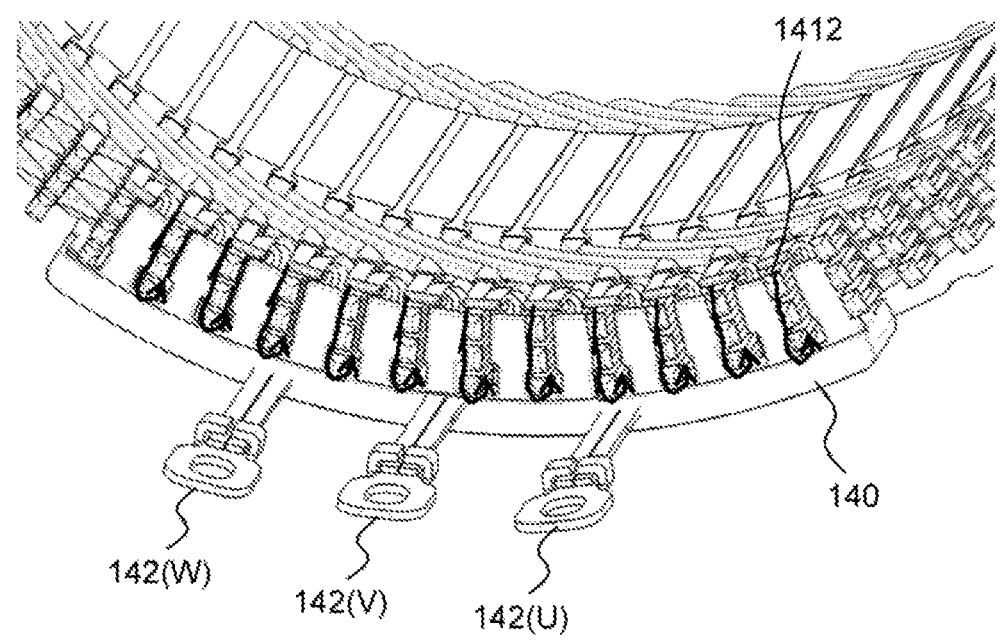
FIG. 8 is a plan perspective view of the stator to which the wire connection plate of the present embodiment is attached.

Next, cooling of the coil in the present embodiment will be described with reference to FIGS. 7 and 8. FIG. 7 is a plan view of the stator 130 to which the wire connection plate 140 is attached, and FIG. 8 is a plan perspective view of the stator 130 to which the wire connection plate 140 is attached. In FIGS. 7 and 8, the flow of the cooling oil is indicated by an arrow.

Cooling oil flows inside the case 10 of the rotating electric machine 100 of the present embodiment, and cools heat generated by copper loss of the stator coil 138. For example, when the automatic transmission and the rotating electric machine 100 are housed in one case, automatic transmission fluid (ATF) flows inside the rotating electric machine 100, and the stator coil 138 is cooled by the ATF flowing around the stator coil 138 inside the rotating electric machine 100. In general, the ATF flows in the slot 122 from the upper surface (for example, the surface of the stator coil 138 on the welding side) of the stator 130 and flows out from the lower surface (for example, the surface on the insertion side of the segment coil) of the stator 130.

In the rotating electric machine 100 of the present embodiment, since the wire connection plate 140 is attached to the upper surface side of the stator 130, the inflow of the ATF into the stator 130 may be hindered depending on the shape of the wire connection plate 140. Therefore, in the wire connection plate 140 of the present embodiment, the opening 1412 is provided on the inner peripheral side of the insulating member 141 of the wire connection plate 140, and the cooling oil is introduced from the opening 1412 into the through hole 1411. Therefore, the cooling oil can be introduced into the stator coil 138 located below the wire connection plate 140, and the stator coil 138 located below the wire connection plate 140 can be cooled.

In addition, the wire connection plate 140 is provided with the reservoir 1413 wider than the opening 1412 on the outer peripheral side of the insulating member 141. Therefore, the cooling oil flowing into the insulating member 141 from the opening 1412 reaches the reservoir 1413 and stays in the reservoir 1413, so that the connection conductors 144, 145, and 146 can be effectively cooled. In addition, since the cooling oil flowing into the insulating member 141 from the opening 1412 cools the insulating member 141, the connection conductors 144, 145, and 146 provided in the insulating member 141 can be cooled.

In the embodiment described above, the example in which the stator coil 138 is cooled by the cooling oil has been described, but the stator 130 of the present invention can be cooled by using a cooling medium (liquid or gas) that is not oil.

As described above, according to the embodiment of the present invention, the stator 130 of the rotating electric machine 100 includes the stator core 132, the plurality of segment coils protruding from the slot 122 of the stator core 132 and arranged in the radial direction, the connection conductors 145 and 146 connecting between the segment coils, and the insulating member 141 holding the connection conductors 145 and 146. The insulating member 141 has the through hole 1411 through which the segment coil penetrates and is accommodated, and has the opening 1412 through which the coolant can flow into the through hole 1411 on the inner peripheral side of the insulating member 141. Therefore, even the stator 130 provided with the wire connection plate 140 can efficiently cool the stator coil 138.

In addition, since the insulating member 141 has the reservoir 1413 where the coolant flowing from the opening 1412 reaches on the outer peripheral side of the through hole 1411, the coolant flows into the reservoir 1413, and the connection conductors 144, 145, and 146 can be effectively cooled.

In addition, since the connection conductors 145 and 146 are connected adjacent to the segment coil disposed on the outermost periphery in the radial direction and are connected adjacent to the segment coil disposed on the innermost periphery in the circumferential direction, the flow of the cooling oil into the opening 1412 is not hindered, and the cooling oil reaching the reservoir 1413 can be effectively cooled.

Note that the above description is merely an example, and when interpreting the invention, there is no limitation or restriction on the correspondence between the matters described in the above embodiment and the matters described in the claims. For example, in the above-described embodiment, a rotating electric machine including a permanent magnet in a rotor has been described as an example, but the present invention can be similarly applied to a stator of a rotating electric machine such as an induction motor. The present invention can also be applied to a rotating electric machine for driving a vehicle other than the rotating electric machine for driving a vehicle.

Further, the present invention is not limited to the above-described embodiments. Various modifications and equivalent configurations may be contained within the scope of claims. For example, the above-described embodiments are given in detail in order to help easy understating of the present invention. The present invention is not limited to be provided all the configurations described above. In addition, some of the configurations of a certain embodiment may be replaced with the configuration of the other embodiment. In addition, the configurations of the other embodiment may be added to the configurations of a certain embodiment. In addition, some of the configurations of each embodiment may be added, omitted, or replaced with respect to the configuration of the other embodiment.

REFERENCE SIGNS LIST 10 case
12 bolt
14A, 14B bearing
100 rotating electric machine
112 housing
115 flange
118 rotation shaft
121 teeth
122 slot
123 core back
130 stator
132 stator core
133 electromagnetic steel sheet
138 stator coil
140 wire connection plate
141 insulating member
1411 through hole
1412 opening
1413 reservoir
142 input/output connection terminal
144 input/output connection conductor
145, 146 connection conductor
150 rotor
152 rotor core
154 permanent magnet
156 magnetic gap
300 slot liner

The invention claimed is:

1. A stator of a rotating electric machine, comprising:
   a stator core;
   a plurality of segment coils protruding from slots of the stator core and arranged in a radial direction;
   a connection conductor that connects the segment coils; and
   an insulating member that holds the connection conductor,
   wherein the insulating member includes
   a through hole through which the segment coil penetrates and is accommodated, and
   an opening through which a coolant can flow into the through hole is provided on an inner peripheral side of the insulating member.

2. The stator of the rotating electric machine according to claim 1, wherein the insulating member includes, on an outer peripheral side of the through hole, a reservoir through which the coolant flowing in from the opening reaches.

3. The stator of the rotating electric machine according to claim 1, wherein
   the connection conductor is configured to
   be connected adjacent to a segment coil disposed on an outermost periphery in a circumferential direction among the plurality of segment coils, and
   be connected adjacent to a segment coil disposed on an innermost periphery in a circumferential direction among the plurality of segment coils.

4. A rotating electric machine comprising the stator according to claim 1.

5. A terminal block mounted on a stator of a rotating electric machine, the terminal block comprising:
   a connection conductor that constitutes a stator winding, protrudes from a slot of a stator core, and connects a plurality of segment coils aligned in a radial direction;
   an insulating member that holds the connection conductor,
   wherein the insulating member includes a through hole through which the segment coil penetrates and is accommodated, and an opening through which a coolant can flow into the through hole is provided on an inner peripheral side of the insulating member.

6. The terminal block according to claim 5, wherein the insulating member has, on an outer peripheral side of the through hole, a reservoir through which the coolant flowing in from the opening reaches.

7. The terminal block according to claim 5, wherein the connection conductor is configured to be connected adjacent to a segment coil disposed on an outermost periphery in a circumferential direction among the plurality of segment coils, and be connected adjacent to a segment coil disposed on an innermost periphery in a circumferential direction among the plurality of segment coils.

\* \* \* \* \*